(12) United States Patent
Shani et al.

(10) Patent No.: US 10,365,995 B2
(45) Date of Patent: Jul. 30, 2019

(54) COMPOSING FUTURE APPLICATION TESTS INCLUDING TEST ACTION DATA

(71) Applicant: ENTIT Software LLC, Sunnyvale, CA (US)

(72) Inventors: Inbar Shani, Yehud (IL); Amichai Nitsan, Yehud (IL); Yaron Burg, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 0 days.

(21) Appl. No.: 15/749,639

(22) PCT Filed: Aug. 4, 2015

(86) PCT No.: PCT/US2015/043574
§ 371 (c)(1),
(2) Date: Feb. 1, 2018

(87) PCT Pub. No.: WO2017/023299
PCT Pub. Date: Feb. 9, 2017

(65) Prior Publication Data
US 2018/0232299 A1 Aug. 16, 2018

(51) Int. Cl.
*G06F 9/44* (2018.01)
*G06F 11/36* (2006.01)
(Continued)

(52) U.S. Cl.
CPC .......... *G06F 11/3684* (2013.01); *G06F 9/455* (2013.01); *G06F 11/3688* (2013.01); *G06F 11/3692* (2013.01); *G06F 8/38* (2013.01)

(58) Field of Classification Search
CPC ............. G06F 11/3684; G06F 11/3672; G06F 11/3688; G06F 11/362
(Continued)

(56) References Cited

U.S. PATENT DOCUMENTS 5,121,501 A * 6/1992 Baumgartner ...... G06F 11/3644
714/35
5,862,381 A * 1/1999 Advani ................ G01R 13/029
345/684
(Continued)

FOREIGN PATENT DOCUMENTS

CN 101833499 A 9/2010
WO WO20142093 A1 12/2014

OTHER PUBLICATIONS

Holzmann et al, "Multivariate Testing of Native Mobile Applications", ACM, pp. 1-10, 2014 (Year: 2014).*
(Continued)

*Primary Examiner* — Anil Khatri

(57) ABSTRACT

Example implementations relate to composing future tests. Some implementations may include a data capture engine to capture data points during test executions of the application under test. The data points may include, for example, test action data and application action data. Additionally, some implementations may include a data correlation engine to correlate each of the data points with a particular test execution of the test executions, and each of the data points may be correlated based on a sequence of events that occurred during the particular test execution. Furthermore, some implementations may also include a test composition engine to compose, based on an interaction with a visualization of results of a verification query of the correlated data points, a future test of the application under test.

16 Claims, 8 Drawing Sheets

(51) Int. Cl.
*G06F 9/455* (2018.01)
*G06F 8/38* (2018.01)

(58) Field of Classification Search
USPC .................................................. 717/123–129
See application file for complete search history.

(56) References Cited

U.S. PATENT DOCUMENTS

| | | | | |
|---|---|---|---|---|
| 6,026,235 | A * | 2/2000 | Shaughnessy | G06F 11/3466 714/E11.2 |
| 7,444,622 | B2 | 10/2008 | Grieskamp et al. | |
| 7,958,497 | B1 * | 6/2011 | Lindo | G06F 11/3636 714/799 |
| 8,065,661 | B2 * | 11/2011 | Sattler | G06F 11/3688 714/38.1 |
| 8,271,950 | B2 | 9/2012 | Bharadwaj | |
| 8,448,146 | B2 | 5/2013 | Pasala et al. | |
| 8,615,739 | B2 | 12/2013 | Nir et al. | |
| 8,707,269 | B1 * | 4/2014 | Kondreddy | G05B 23/0256 700/29 |
| 8,756,586 | B2 * | 6/2014 | Khanapurkar | G06F 11/3414 717/130 |
| 8,917,832 | B2 * | 12/2014 | Catlin | H04M 3/4938 379/88.01 |
| 8,924,335 | B1 | 12/2014 | Trefler | |
| 8,972,943 | B2 * | 3/2015 | Papakipos | G06F 9/5027 714/35 |
| 8,978,106 | B2 * | 3/2015 | Swamy | G06F 17/00 705/27.1 |
| 9,015,667 | B2 * | 4/2015 | Meijer | G06F 11/076 717/124 |
| 9,021,445 | B2 * | 4/2015 | Gataullin | G06F 11/3636 717/128 |
| 9,389,992 | B2 * | 7/2016 | Gataullin | G06F 11/3636 |
| 9,417,993 | B2 * | 8/2016 | Gataullin | G06F 11/3676 |
| 9,575,874 | B2 * | 2/2017 | Gautallin | G06F 11/3466 |
| 10,198,346 | B1 * | 2/2019 | Cole | G06F 11/3688 |
| 2005/0268285 | A1 * | 12/2005 | Bagley | G06F 11/3688 717/124 |
| 2007/0288903 | A1 | 12/2007 | Manglik | |
| 2008/0250051 | A1 | 10/2008 | Grechanik | |
| 2009/0178021 | A1 | 7/2009 | Alluri | |
| 2012/0079324 | A1 | 3/2012 | Aphale | |
| 2012/0102469 | A1 * | 4/2012 | Kapoor | G06F 11/362 717/129 |
| 2017/0293551 | A1 | 10/2017 | Shani et al. | |
| 2018/0137036 | A1 | 5/2018 | Shani et al. | |

OTHER PUBLICATIONS

Pradel et al, "EventBreak: Analyzing the Responsiveness of User Interfaces through Performance-Guided Test Generation", ACM, pp. 33-47, 2014 (Year: 2014).*
Artzi et al, "Directed Test Generation for Effective Fault Localizati", ACM, pp. 49-59 (Year: 2010).*
Li et al, "Test Data Compression Using Dictionaries with Selective Entries and Fixed-Length Indices", ACM Transactions on Design Automation of Electronic Systems, vol. 8, No. 4, pp. 470-490 (Year: 2003).*
Sanchez et al, "Automatic Support for Testing Web-Based Enterprise Applications", ACM, pp. 325-330 (Year: 2006).*
Shen et al, "Research on the Application of Data Mining in Software Testing and Defects Analysis", IEEE, pp. 219-221 (Year: 2009).*
"Test Result Analysis and Reports—Load Testing with LoadRunner Tutorial #8", Software Testing Help, Jan. 16, 2014, 6 pages. <http://www.softwaretestinghelp.com/loadrunner/hp-loadrunner-tutorial-8/>.
G. Owen, "App Performance Monitoring Closes Gap Between Testing and Production", TechTarget network, retrieved from Internet on Dec. 13, 2018, 7 pages. <http://searchsoftwarequality.techtarget.com/tip/App-performance-monitoring-closes-gap-between-testing-and-production>.
Wikipedia, "Directed Acyclic Graph", retrieved from Internet on Dec. 13, 2013, 12 pages. <http://en.wikipedia.org/wiki/Directed_acyclic_graph#Casual_structures>.
Huang, X. et al., "GO: a Cluster Algorithm for Graph Visualization," (Research Paper), Jun. 2015, 12 pages.
International Searching Authority., International Search Report and Written Opinion dated May 3, 2016 for PCT Application No. PCT/US2015/043574 Filed Aug. 4, 2015 2 pages.
Vos, T.E.J. et al., "The Fittest Tool Suite for Testing Future Internet Applications," (Research Paper), May 22, 2014, 32 pages.

* cited by examiner

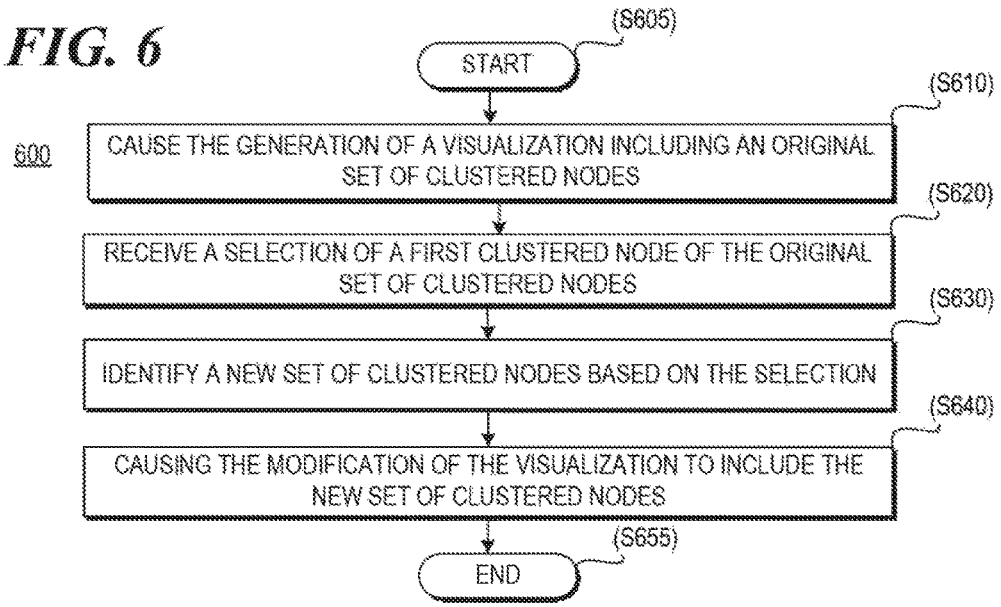
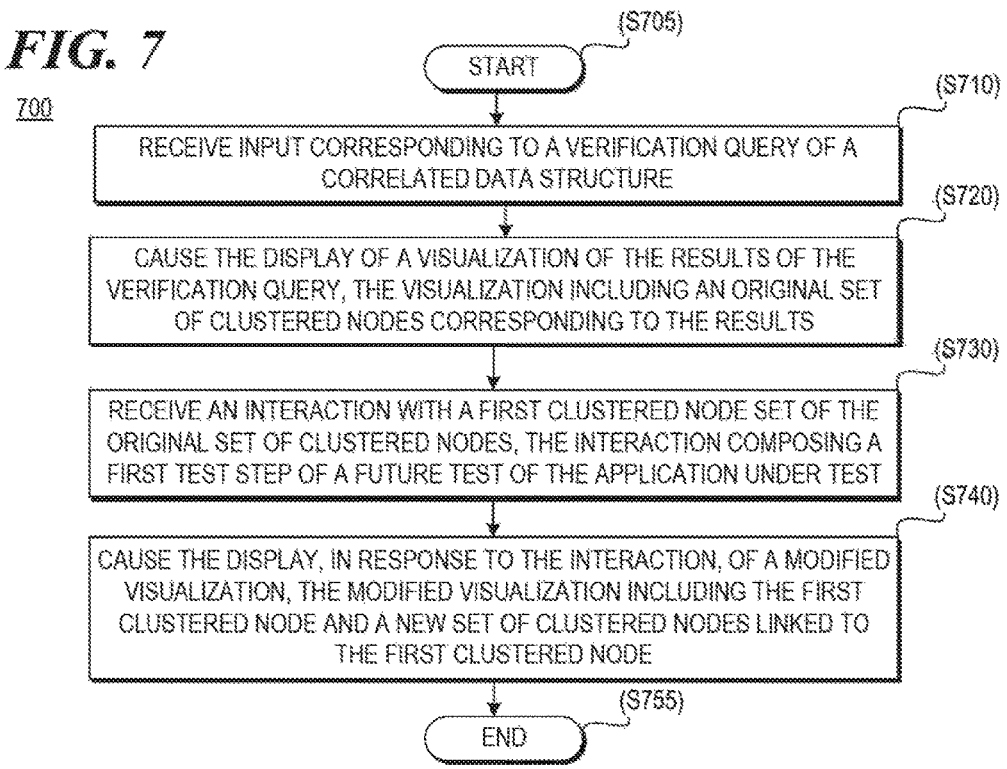

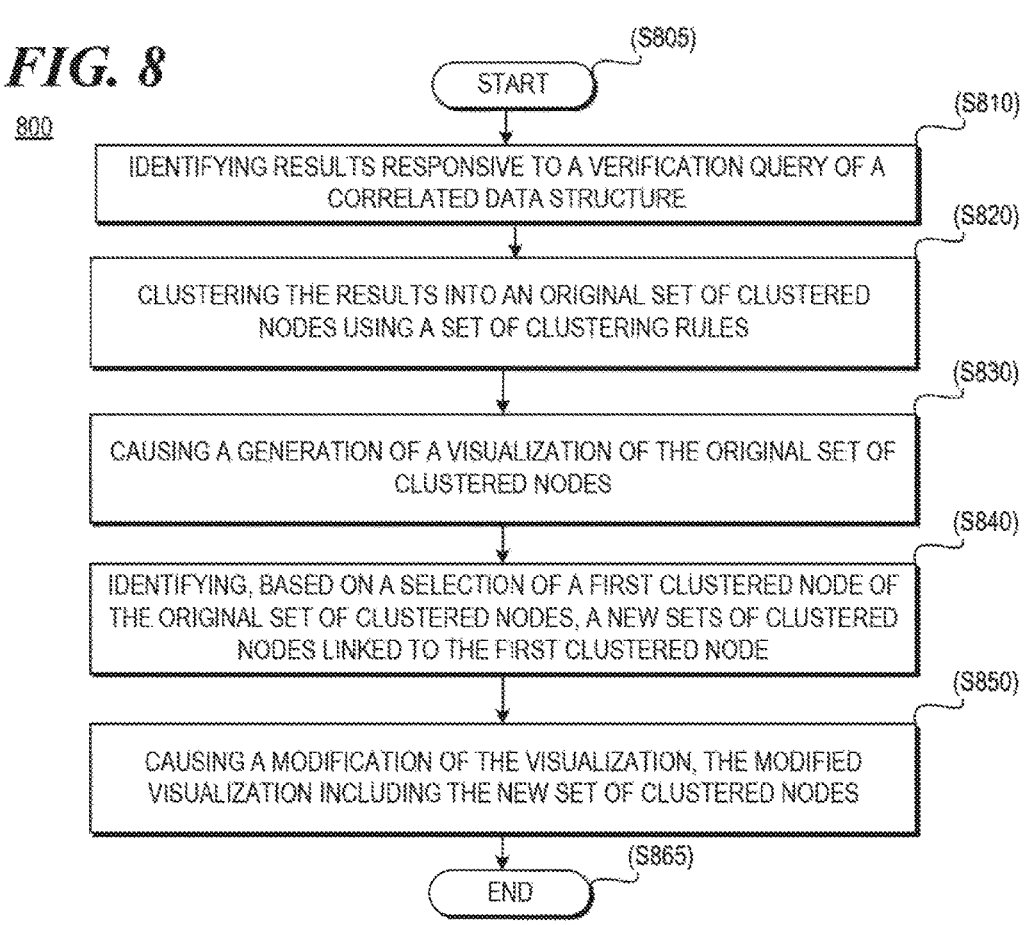

COMPOSING FUTURE APPLICATION TESTS INCLUDING TEST ACTION DATA

BACKGROUND

Application testing may be performed to provide information about an application under test ("AUT"). For example, application testing may be performed to determine whether the AUT includes any errors or other defects. While various techniques are available for application testing, basic application testing procedures may involve two main types of test steps: (1) action steps which manipulate, drive, or query an application under test ("AUT"); and (2) verification steps which verify the expected outcomes associated with the action steps.

BRIEF DESCRIPTION OF THE DRAWINGS

The following detailed description references the drawings, wherein:

FIG. 6 is a flaw chart of an example process for composing future tests consistent with disclosed implementations;

FIG. 7 is a flow chart of an example process for composing future tests consistent with disclosed implementations;

FIG. 8 is a flow chart of an example process for composing future tests consistent with disclosed implementations.

DETAILED DESCRIPTION

Figure 1:
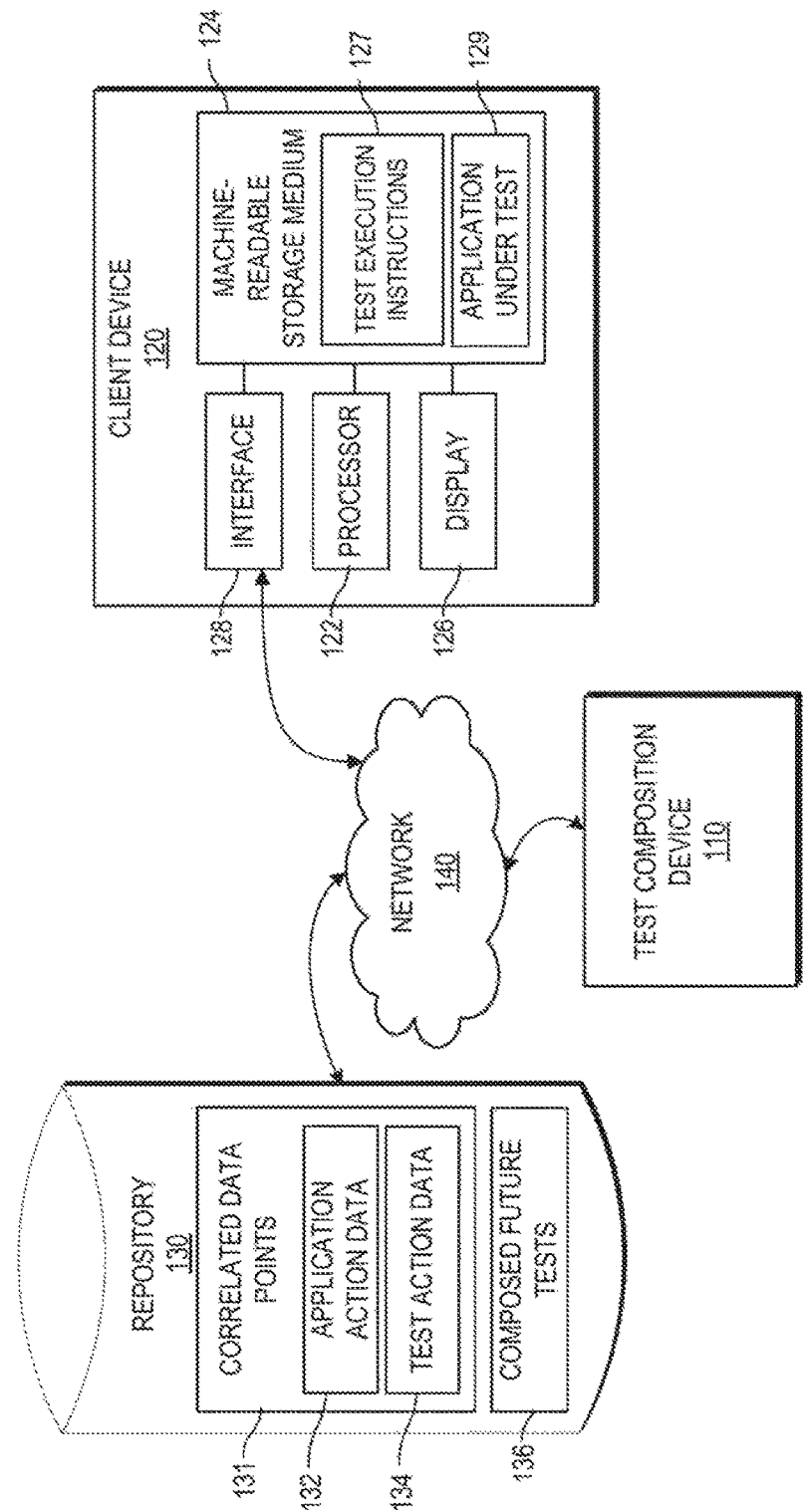
FIG. 1 is a block diagram of an example system for composing future tests consistent with disclosed implementations.

The following detailed description refers to the accompanying drawings. Wherever possible, the same reference numbers are used in the drawings and the following description to refer to the same or similar parts. While several examples are described in this document, modifications, adaptations, and other implementations are possible. Accordingly, the following detailed description doss not limit the disclosed examples. Instead, the proper scope of the disclosed examples may be defined by the appended claims.

As discussed above, basic application testing procedures may involve two main types of test steps: (1) action or test steps which manipulate, drive, or query an application under test ("AUT"); and (2) verification steps which verify the expected outcomes associated with the action steps. Traditionally, this basic application testing procedure may create a dependency between the actions and verifications. For example, the verifications may need to be performed during the execution of the test of the AUT. This dependency may have several shortcomings, including the need to re-run a test execution of an AUT when the verification changes (even if the actions have not changed), a tendency to only verify what is being acted upon (e.g., if the action is to click a button, a user will verify that the button has been clicked), difficulty correlating action step outcomes with extents at other levels of the AUT (e.g., server logs, database logs, application logs, etc.), and various maintenance challenges based on changed actions and/or changed verifications. For example, consider the case where an AUT is a banking application and the test case is determining whether funds are transferred from a first account ("Account A") to a second account ("Account B"). A tester may execute the test case to perform the fund transfer and verify that the transferred amount is indeed added to Account B. After completing the test, the tester has decided that another verification is needed—verifying that a sign on procedure has been performed. To execute that new verification, the tester may need to revise the test to include a test action related to the sign on procedure, discard the previously-executed results, run or re-run each of the action steps, and then verify the results of each of the action steps during the execution of the revised test. Such errors can be a waste of a tester's time and resources.

Some examples disclosed herein may help avoid the need to revise and re-execute a test by separating test actions from test verifications. As the test actions are separated from the test verifications, examples disclosed herein can compose tests that can be performed and verified in the future (hereinafter "future tests"). For example, some implementations may monitor and capture data points from test executions of an AUT, correlate the data points, and define, persist, and execute verification queries of the correlated data points. The queries may be considered to be a new method of defining expected application behavior, and may serve as the verification steps in traditional scripts. For example, some implementations may allow testers to trace events that occurred during historical test executions of the AUT to compose a future test. In some implementations, the future test may be compose based on an interaction with a visualization of the results of a verification query of the correlated data points.

Referring now to the drawings, FIG. 1 is a block diagram of an example system 100 for composing future tests. System 100 may be implemented in a number of different configurations without departing from the scope of the disclosed examples. In the example shown in FIG. 1, system 100 may include a test composition device 110, a client device 120, a repository 130, and a network 140 for connecting test composition device 110 with client device 120 and/or repository 130.

Test composition device 110 may be a computing system that performs various functions consistent with disclosed examples. For example, test composition device 110 may be a server, a desktop computer, a laptop computer, and/or any other suitable type of computing device. In some examples, test composition device 110 may process information received from client device 120 and/or repository 130. For example, test composition device 110 may compose future tests based on data captured from client device 120 and/or received from repository 130. Examples of test composition device 110 and certain functions that may be performed by device 110 are described in greater detail below with respect to, for example, FIGS. 2-9B.

Client device 120 may be a computing system operated by a user. For example, client device 120 may be a desktop computer, a laptop computer, a tablet computing device, a mobile phone, and/or any other suitable type of computing device. In some examples, client device 120 may be a computing device to perform operations consistent with certain disclosed implementations. For example, client device 120 may be adapted to transmit data related to test executions of an AUT to test composition device 110, such as, for example, data related to action steps performed during application testing.

Client device 120 may include a processor to execute instructions stored in a machine-readable storage medium. In the example shown in FIG. 1, client device 120 may include a processor 122, a machine-readable storage medium 124, a display device 126, and an interface 128. Processor 122 of client device 120 may be at least one processing unit (CPU), microprocessor, and/or another hardware device to execute instructions to perform operations. For example, processor 122 may fetch, decode, and execute instructions stored in machine-readable storage medium 124 (such as test execution application instructions 127 and/or AUT instructions 129) to test an AUT. While in the example shown in FIG. 1 the AUT resides on client device 120, test execution instructions 127 and/or the AUT 129 may reside on different machines and/or may span multiple computing systems. Machine-readable storage medium 124 may be any electronic, magnetic, optical, or other non-transitory storage device that stores instructions executed by processor 122. Display 126 may be any type of display device that presents information, such as a user interface of an AUT, a test verification interface, and the like, to a user (e.g., a tester) operating client device 120. Interface 128 may be any combination of hardware and/or programming that facilitates the exchange of data between the internal components of client device 120 and external components, such as test composition device 110. In some examples, interface 128 may include a network interface device that allows client device 120 to receive and send data to and from various components, such as to and from test composition device 110 via network 140.

Repository 130 may be any type of storage system configuration that facilitates the storage of data. In some implementations, repository 130 may facilitate the locating, accessing, and retrieving of data points captured during test executions of an AUT (e.g., SaaS, SQL, Access, etc. databases). For example, repository 130 may store correlated data points 131, which may include application action data 132 and test action data. In some implementations, repository 130 may also store composed future tests 136 generated by, for example, test composition device 110. While in the example shown in FIG. 1 the correlated data points 131 and the composed future tests 136 resides on repository 130, any portion of the correlated data points 131 and/or the composed future tests 136 may reside on different storage systems.

Repository 130 can be populated by a number of methods. For example, test composition device 110 may populate repository 130 with data points captured and correlated by test composition device 110, and store the correlated data points 131 in repository 130. In some implementations, the data points may be stored as a directed acyclic graph ("DAG"). Traditionally, a DAG is a directed graph formed by a collection of vertices (e.g., a fundamental unit of which the graph is formed) and directed edges (e.g., an edge that points from a first vertex in the collection of vertices to a second vertex in the collection of vertices). A DAG, as used herein, doesn't necessarily mean a graphic representation of the data included in a traditional DAG. Instead, a DAG as used herein may include the graphic representation and/or a data structure that stores the data points in a manner that allows system 100 to determine data represented by the traditional DAG (e.g., categorization of the data points, directed edges associated with particular data points, and/or vertices associated with the data points). In some examples, the data structure may be an array, a record, a database entry, a lookup table, a hash table, a map, a tree, a linked list, and/or any other type of data structure. An example of a DAG consistent with disclosed implementations is discussed in more detail below with respect to, for example, FIG. 5.

While in the example shown in FIG. 1 repository 130 is a single component external to components 110 and 120, repository 130 may comprise separate components and/or may be part of devices 110, 120, and/or another device. In some implementations, repository 130 may be managed by components of device 110 and/or other devices that are capable of accessing, creating, controlling and/or otherwise managing data remotely through network 140.

Network 140 may be any type of network that facilitates communication between remote components, such as test composition device 110 and client device 120. For example, network 140 may be a local area network (LAN), a wide area network (WAN), a virtual private network, a dedicated intranet, the Internet, and/or a wireless network.

The arrangement illustrated in FIG. 1 is simply an example, and system 100 may be implemented in a number of different configurations. For example, while FIG. 1 shows one test composition device 110, client device 120, repository 130, and network 140, system 100 may include any number of components 110, 120, 130, and 140, as well as other components not depicted in FIG. 1. For example, system 100 may omit any of components 110, 120, 130, and 140, and/or the functionality of at least one of components 110, 120, 130, and 140 may be incorporated into another component (e.g., components 110, 120, 130, 140, and/or a component not shown in FIG. 1).

Figure 2:
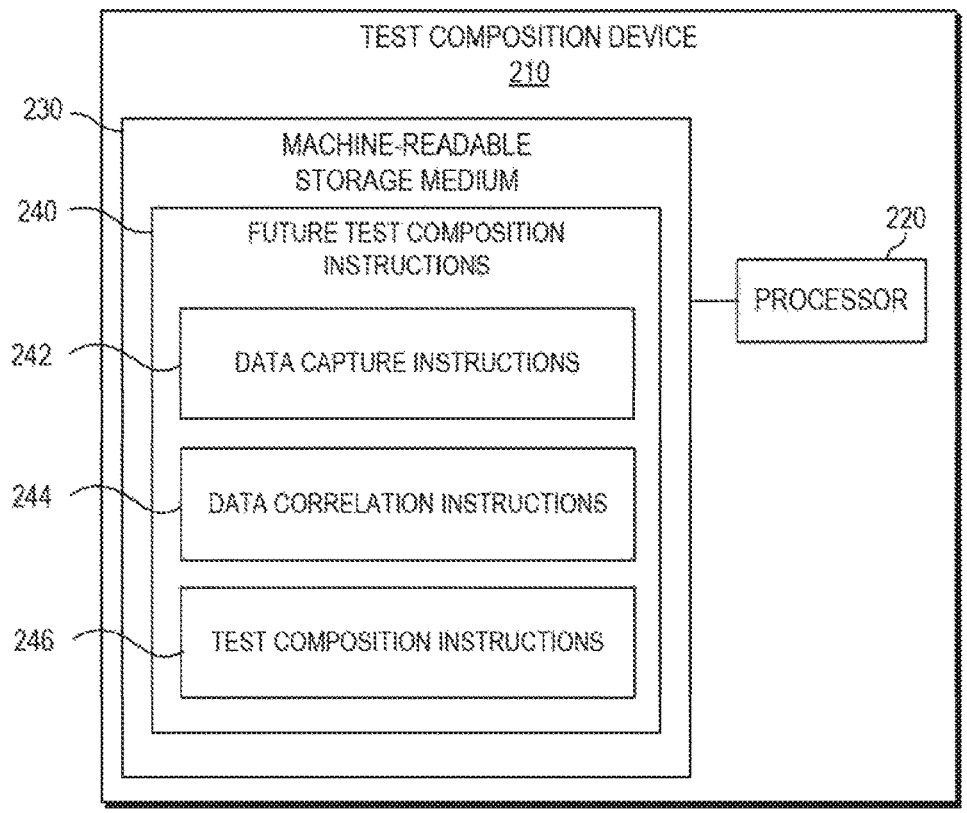
FIG. 2 is a block diagram of an example test composition device consistent with disclosed implementations.

FIG. 2 is a block diagram of an example test composition device 210 consistent with disclosed implementations. In certain aspects, test composition device 210 may correspond to test composition device 110 of FIG. 1. Test composition device 210 may be implemented in various ways. For example, device 210 may be a special purpose computer, a server, a mainframe computer, and/or any other suitable type of computing device. In the example shown in FIG. 2, test composition device 210 may include a processor 220 and a machine-readable storage medium 230.

Processor 220 may be at least one processing unit (CPU), microprocessor, and/or another hardware device to execute instructions to perform operations. For example, processor 220 may fetch, decode, and execute future test composition instructions 240 (e.g., instructions 242, 244, and/or 246) stored in machine-readable storage medium 230 to perform operations consistent with disclosed examples.

Machine-readable storage medium 230 may be any electronic, magnetic, optical, and/or other physical storage device that stores executable instructions. Thus, machine-readable storage medium 230 may be, for example, memory, a storage drive, an optical disc, and the like. In some implementations, machine-readable storage medium 230 may be a non-transitory machine-readable storage medium, where the term "non-transitory" does not encompass transitory propagating signals. Machine-readable storage medium 230 may be encoded with instructions that, when executed by processor 230, perform operations consistent with disclosed implementations. For example, machine-readable storage medium 240 may include instructions that perform operations to compose future tests by capturing data points during test executions of an AUT, correlating each of the data points with a particular test execution of the AUT, and composing, based on an interaction with a visualization of results of a verification query of the correlated data points, a future test of the AUT. In the example shown in FIG. 2, machine-readable storage medium 230 may include data capture instructions 242, data correlation instructions 244, and test composition instructions 246.

Data capture instructions 242 may function to capture data points during test executions of an AUT. In some implementations, when data capture instructions 242 are executed by processor 220, data capture instructions 242 may cause processor 220 and/or another processor to capture data points during test executions of the AUT. For example, data capture instructions 242 may cause processor 220 and/or another processor to access, receive, or otherwise obtain the data points from one or more computing systems that execute the test and/or implement the AUT during the test executions. In some examples, the data points may be captured by installing agents on various physical or virtual system components to monitor how the particular component(s) function and to transmit the data points to a storage device, such as a storage device associated with test composition device 110. The transmitted data points may then be received and/or captured by test composition device 110. The agents may be simple (e.g., agents monitoring a central processing unit ("CPU") that may simply ask an operating system what the CPU use level is) or complex (e.g., agents integrated with a testing tool that follow all of the test steps during test executions of an AUT). Alternatively (or in combination with the use of agents) the information may be monitored agentlessly. For example, a monitoring server may query various component(s) for information about the component(s) memory usage.

In some implementations, the captured data points may include application action data that includes data related to actions performed by the application under test in response to test actions performed during the test executions, the application action data may include data related to various levels of the AUT, such as a user interface level (e.g., UI snapshots, UI object extractions, etc.), a code level (e.g., code executed behind the UI), a network communication level (e.g., network communications between client device 120 and test composition device 110), a database level (e.g., databases accessed by the AUT during test execution), and an environment level (e.g., data related to the environment of the AUT such as data related to hardware (e.g., device build, CPU usage, memory usage, resource usage, etc.) and programming (e.g., operating system, browser, etc.) that are related to the execution of the test of the AUT (e.g., server logs) and/or that relate to the execution of the AUT itself (e.g., application server errors)). In some examples, the captured data points may include test action data that includes data related to the test actions performed during the test executions, such as test actions and/or steps performed during the particular test execution state (e.g., start test step (e.g., data indicating that the data point is related to the start of a test step), end test step (e.g., data indicating that the data point is related to the end of a test step), report test result step (e.g., data indicating that the data point is related to a particular result of a test step), complete test step (e.g., data indicating that the data point is related to the completion of an entire test), and/or a report test step (e.g., data indicating that the data point relates to reporting the results on the entire test)), and/or metadata related to the AUT (e.g., AUT version), the particular test execution state (e.g., test date/time, tester name, etc.), and the like. Examples of capturing data points during test executions of an AUT are described in further detail below with respect to, for example, FIGS. 2-9B.

Data correlation instructions 244 may function to correlate data points. For example, when data correlation instructions 244 are executed by processor 220, data correlation instructions 244 may cause processor 220 to correlate each of the data points with a particular test execution of the AUT. In some implementations, the data points may be correlated based on a sequence of events that occurred during the particular test execution. For example, data correlation instructions 244 may cause processor 220 to generate a DAG and/or store the data in a manner that allows verification queries of the data. In some examples, the DAG and/or the correlated data points may be stored in a repository, such as repository 130. Examples of correlating data points are described in further detail below with respect to, for example, FIGS. 4 and 5.

Test composition instructions 246 may function to compose, based on an interaction with a visualization of the results of a verification query of the correlated data points, a future test of the AUT. For example, when test composition instructions 246 are executed by processor 220, test composition instructions 246 may cause processor 220 to cause the generation of a visualization of the results of the verification query of the correlated data points where the visualization includes sets of clustered nodes, receive a selection of a first set of the sets of clustered nodes, identify new sets of clustered nodes based on the correlation of the data points and the selection, and modifying the visualization to include the new sets of clustered nodes. In some implementations, the future test may function to verify an actual behavior of the AUT separately from a particular future test execution. For example, the future test may be stored in a storage system, such as repository 130 of FIG. 1. When new test executions of the AUT are performed, the data points associated with these new test executions may be captured and correlated using the methods described herein. If the future test is performed during the new test executions, test composition instructions 246 may generate a notification that the future test has been executed and/or provides verification results of the future test to a user (e.g., a tester). Examples of composing future tests are described in further detail below with respect to, for example, FIGS. 3-9B.

Figure 3:
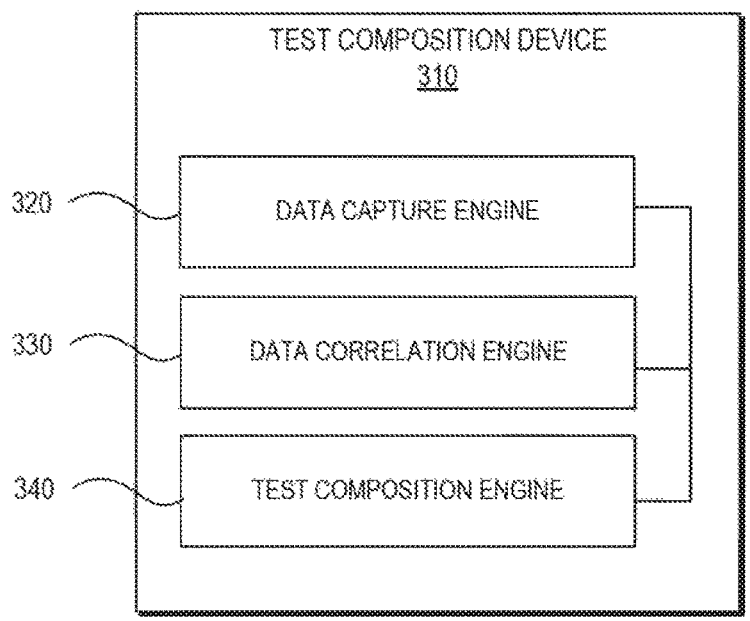
FIG. 3 is a block diagram of an example test composition device consistent with disclosed implementations.

FIG. 3 is a block diagram of an example test composition device 310 consistent with disclosed implementations. In certain aspects, test composition device 310 may correspond to test composition device 110 of FIG. 1 and/or test composition device 210 of FIG. 2. Device 310 may be implemented in various ways. For example, device 310 may be a special purpose computer, a server, a mainframe computer, and/or any other suitable type of computing system. In the example shown in FIG. 3, device 310 may include a data capture engine 320, a data correlation engine 330, and a test composition engine 340.

Engines 320, 330, and 340 may be electronic circuitry for implementing functionality consistent with disclosed examples. For example, engines 320, 330, and 340 may represent combinations of hardware devices and programming to implement the functionality consistent with disclosed implementations. In some examples, the functionality of engines 320, 330, and/or 340 may correspond to operations performed by test composition device 210 of FIG. 2, such as operations performed when future test composition instructions 240 are executed by processor 220 (described above with respect to FIG. 2). In FIG. 3, data capture engine 320 may represent a combination of hardware and programming that performs operations similar to those performed when processor 220 executes data capture instructions 242. Similarly, data correlation engine 330 may represent a combination of hardware and programming that performs operations similar to those performed when processor 220 executes data correlation instructions 244, and test composition engine 340 may represent a combination of hardware and programming that performs operations similar to those performed when processor 220 executes test composition instructions 246.

Figure 4:
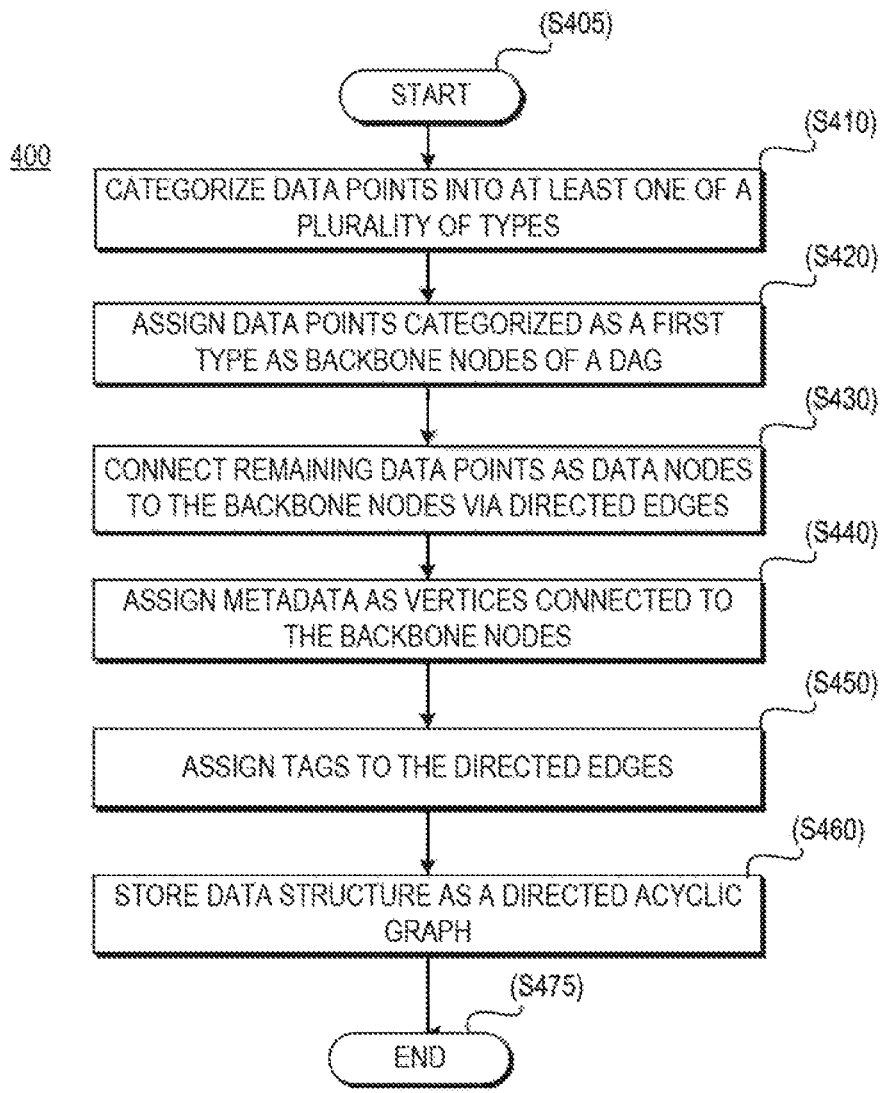
FIG. 4 is a flow chart of an example process for correlating data points consistent with disclosed implementations.

FIG. 4 is a flow chart of an example process 400 for correlating data points consistent with disclosed implementations. Although execution of process 400 is described below with reference to system 100 of FIG. 1 and/or specific components of system 100, other suitable systems and devices for execution of at least one step of process 400 may be used. For example, processes described below as being performed by test composition device 110 may be performed by test composition device 210, test composition device 310, and/or any other suitable device. Process 400 may be implemented in the form of executable instructions stored on a machine-readable storage medium and/or in the form of electronic circuitry.

Process 400 may start (step S405) after data points have been captured during test executions of an AUT. Once the data points have been captured, process 400 may function to correlate each of the data points by categorizing each of the data points into at least one of a plurality of types, the at least one of the plurality of types including a first type. For example, the data points may be correlated by generating a DAG, such as DAG 500 of FIG. 5. In some implementations, the DAG may be generated based on timestamps associated with the data points. For example, process 400 may include categorizing the data points into at least one of a plurality of types (step S410). For example, the data points may be categorized based on steps of the test execution, data type (e.g., CPU, memory, UI object, user action, network packet, etc.), a particular user (e.g., an identify of the user who was running the test), AUT build (the specific build version of the AUT when the data points were captured), and/or any other suitable categorization. In some implementations, the plurality of types may include a first type. For example, the first type may be test actions of the test execution such as, for example, steps involved in tester interaction with a user interface of the AUT. As another example, the first type may be application actions of the test execution such as, for example, actions of the AUT that are performed in response to the test actions. The definition of the particular types may be predetermined, or may be based on input from a user. For example, a user may define the application action type as all actions completed by the AUT between a test action and a full update to a user interface (e.g., may transmit the user interface has been updated such that all of the text and/or graphics have fully loaded) of the AUT.

Process 400 may also include assigning data points categorized as the first type as backbone nodes of a DAG (step S420). For example, system 100 may assign the data points associated with test steps of the test execution as a backbone of the DAG. Thus, in some implementations, the data points associated with test steps may be considered to be backbone nodes, and the remaining data points (e.g. data points associated with application actions) may be considered to be data nodes.

Process 400 may also include connecting remaining data points (e.g., a set of the data points that are not categorized as the first type) as data nodes to the backbone nodes via directed edges based on timestamps associated with the remaining data points (step S430). For example, the data points may be connected via directed edges from a first data point of the first type (e.g., a first test step of the test steps). In some examples, the data points may be connected based on a length of time between a time stamp associated with a particular data point of the captured data points, and a time stamp associated with the first test step. For example, system 100 may order the test steps in the backbone sequentially based on when the test steps were executed. Events associated with a particular test step may be traced and associated with the particular test step. For example, system 100 may trace UI objects. A UI scanner may run periodically and automatically identify structured objects in the UI, their attributes, and their values. As another example, system 100 may trace system events associated with a particular test steps by implementing a thread event monitor that monitors threads for a creation of an object, the run of an object, the termination of an object, and the like, and associate the creation, run, and/or termination of objects to a particular test event based on thread and object identifiers.

Process 400 may also include assigning the metadata as vertices connected to the backbone nodes (step S440). For example, system 100 may determine the elements of the backbone and may assign metadata (e.g., data points) traced to each particular element (e.g., each test step). For example, system 100 may trace the metadata based on time-relations (e.g., the event happened after a particular test step) or based on another suitable methodology (e.g., coloring network packets to trace them to a server code).

Process 400 may also include assigning tags to the directed edges to identity a type of relation between the vertices (step S450). In some implementations, system 100 may assign tags to the directed edges based on data received from the agents installed on the various physical or virtual system components. For example, the agents may include instructions, that when executed by a processor, compare an event occurring with the system to a list of rules. If the event matches a particular rule, the agent notes the tag association between events. For example, assume that the list of rules includes a use tagging rule that requires tagging a directed edge as "use" when a test step involves the usage of a browser. When a test step is executed that invokes an object named "browser," the agent may compare the invocation of the object to the list of roles and, based on the use tagging rule in the list, the directed edge as "use."

Process 400 may also include storing the DAG (step S460) in a storage device. In some implementations, the DAG may be stored in a storage device such as a non-transitory computer-readable storage medium (e.g. a machine-readable storage medium in test composition device 110, repository 130, and/or in another device). After the data points have been categorized (step S410), the data points have been assigned (step S420), the remaining data points have been connected (step S430), the metadata has been assigned as vertices (step S440), the tags have been assigned to directed edges (step S450), and/or the DAG has been stored (step S460), process 400 may end (step S475).

Figure 5:
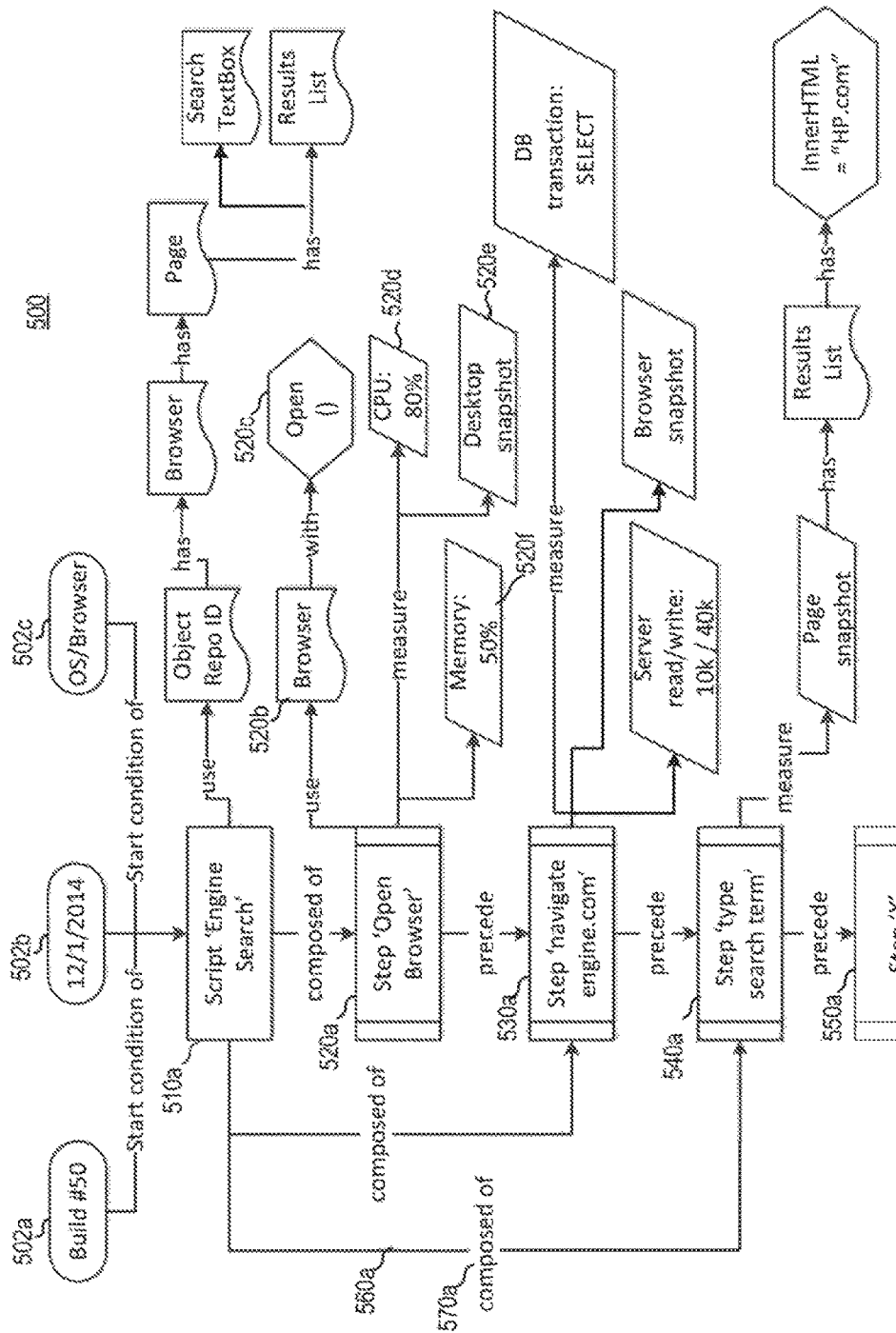
FIG. 5 is a block diagram of an example directed acyclic graph ("DAG") consistent with disclosed implementations.

FIG. 5 is an example of a block diagram of a DAG 500 consistent with disclosed implementations. For example, DAG 500 may represent data points captured during test executions of an AUT that have been correlated based on a sequence of events that occurred during a particular test execution. Although the example DAG 500 is described below as being managed by, updated by, and/or otherwise utilized by system 100 of FIG. 1 and/or specific components of system 100, other suitable systems and devices for managing, updating, and/or otherwise utilizing DAG 500 may be used. For example, processes described below as being performed by test composition device 110 may be performed by test composition device 210, test composition device 310, and/or any other suitable device. Processes performed with respect to DAG 500 may be implemented in the form of executable instructions stored on a machine-readable storage medium and/or by electronic circuitry As shown in FIG. 5, DAG 500 may include data related to one or more particular test executions of an AUT. As shown in FIG. 5, the data includes data points related to application data 502a (e.g., build number), test data (e.g., the date of the test) 502b, and environment data 502c (e.g., operating system and browser type). DAG 500 also includes a backbone (the collective of test steps 510a, 520a, 530a, 540a, and 550a) which serves as the anchor for each of the vertices in the DAG. In some implementations, each data point may be considered to be a node within the DAG and may be classified based on the categorization of the particular data points (e.g., a backbone node (e.g., a test action node), an application action node, and the like). In this example, the backbone is comprised of test steps performed during test executions of the AUT, but DAGs consistent with disclosed implementations may use any suitable categorization of the data points as the backbone. For example, the backbone may be comprised according to user actions, recorded AUT web pages, UI objects, and/or any other suitable categorization.

The backbone of DAG 500 is correlated based on a sequence of events that occurred during the particular test execution, and thus the backbone links various ones of test steps 510a, 520a. 530a, 540a, and 550a together. In the example shown in FIG. 5, test step 510a occurred before test step 520a, test step 520a occurred before test step 530a, test step 530a occurred before test step 540a, and test step 540a occurred before test step S550a. Each portion of the backbone (e.g., each test step) in this example is connected via directed edges (only directed edge 560a has been labelled for clarity) from the first test step 510a of the test steps to the last test step 550a of the test steps, and the directed edges have been tagged (only tag 570a has been labelled for clarity) to identify a type of relation between the vertices. For example, test step 510a is directly linked with test steps 520a, 530a, and 540a via the directed edges, and the cause and/or effect of the linkage is shown in the tagging. For example, test step 510a is composed of test steps 520a, 530a, and 540a, test step 520a precedes test step 530a, test step 530a precedes test step 540a, and test step 550a precedes test step 540a.

Furthermore, as shown in FIG. 5, each test step in DAG 500 has additional information that was captured from the testing and/or application environment and was correlated with the particular test step. This additional information (e.g. metadata) has been assigned as vertices (only vertices 520b, 520c, 520d, 520e, and 520f have been labelled for clarity) connected to the backbone. For example, test step 520a relates to opening a browser. In this case, the step of opening the browser included using the browser (an object) and it was used with a specific action (in this case open). Thus, during this particular test execution state the browser was automatically opened by calling the open function of the browser. This information is modelled in DAG 500 not only by linking the test actions and what follows in terms of the AUT and its environment, but also by the tags that indicate the conceptual meaning of those steps. Each test action and the linking of the actions that follow in response to the test action in terms of the AUT and its environment may be considered to be a node chain of the DAG. Thus, in some implementations, there may be a node chain for each test action performed during the test execution.

FIG. 6 is a flow chart of an example process 600 for composing future tests consistent with disclosed implementations. Although execution of process 600 is described below with reference to system 100 of FIG. 1 and/or specific components of system 100, other suitable systems and devices for execution of at least one step of process 600 may be used. For example, processes described below as being performed by test composition device 110 may be performed by test composition device 210, test composition device 310, and/or any other suitable device. Process 600 may be implemented in the form of executable instructions stored on a machine-readable storage medium and/or in the form of electronic circuitry.

Process 600 may start (step S605) after a verification query of the correlated data points has been executed. For example, a user may utilize system 100 to compose a future test comprising a plurality of test actions (i.e., test steps) and/or associated application actions performed in a particular order. The composition of the future test may be performed by interacting with a visualization of results of the verification query. The verification query may include at least one of test action verification information (e.g., information to verify a test action) and application action verification information (e.g., information to verify an application action). For example, the verification query may be a series of conditional statements, questions, or any other suitable input. The order in which the test actions and/or the associated application actions are to be performed during the future test may be considered to be the verification execution sequence. Thus, in some examples, a verification execution sequence may include steps related to a plurality of verification queries, and a future test may comprise a verification execution sequence.

In some implementations, the verification queries may be entered into a user interface (e.g. test composition interface 9A and/or 9B) using a domain-specific language (e.g., a computer language specialized to test composition device 110) and/or any other input (e.g., natural language) that may be translated by test composition device 110 into a domain-specific language, such as a DAG verification query (e.g., a query capable of obtaining relevant information from a DAG, such as DAG 500 of FIG. 5). In some implementations, the domain-specific language may be similar to behavior-driven-development syntax.

Process 600 may include causing the generation of a visualization of the results of the verification query of the correlated data points (step S610). For example, in response to the verification query, test composition device 110 may query repository 130 to obtain data related to the correlated captured data points that are responsive to the verification query. For example, test composition engine 340 may query repository 130 using one or more of the processes and/or components discussed above, and may receive data that is responsive to the query. For example, test composition engine 340 may query repository 130 to identify backbone nodes of a DAG, such as backbone nodes corresponding to test steps performed during historical test executions of the AUT.

In some implementations, the visualization may include sets of clustered nodes. For example, test composition engine 340 may cluster the received data into an original set of clustered nodes based on a set of clustering rules. For example, test composition engine 340 may cluster the received data into the original set of clustered nodes based on a similarity algorithm that compares the data nodes associated with each of the backbone nodes that are responsive to the verification query based on, for example, an exact comparison between data nodes, a fuzzy comparison between data nodes, specific types of data nodes, and/or any other suitable basis of comparison. Thus, in some implementations, the original set of clustered nodes are backbone nodes, such as backbone nodes of a DAG. For example, if the verification query identified 100 backbone nodes, those 100 identified backbone nodes may be clustered into two clustered nodes (e.g., a first clustered node and a second clustered node) based on the similarity algorithm. The first clustered node could represent 35 of 100 identified backbone nodes and the second clustered node could represent the remaining 65 of the identified backbone nodes. In some implementations, each of the first clustered node and the second clustered node may be visualized as a single element in the visualization, even though each may represent a plurality of backbone nodes.

Process 600 may also include receiving a selection of a first clustered node of the original set of clustered nodes (step S610). In some implementations, the selection may compose a first test step of the future test. For example, a user may interact with the visualization by clicking on the clustered nodes in the original set of clustered nodes to select a clustered node as a first test step of the future test. Test composition engine 340 may identify the user action corresponding to the selection, and may store the test step corresponding to the selected clustered node as a first test step of the future test.

In some implementations, when a user interacts with a clustered node (e.g., clicking on the clustered node, hovering over the clustered node, etc.), the visualization may display a clustered node summary. The clustered node summary may help a user identify which of the clustered nodes to select to compose the future test. In some implementations, the clustered node summary may include statistical information corresponding to the clustered node that was interacted with. For example, test composition engine 340 may analyze the data corresponding to each clustered node, and the statistical information may be based on the analysis of the correlated data points corresponding to the clustered node. In some implementations, the statistical information may include the total number of backbone nodes in a clustered node, the longest chain of backbone nodes in the clustered node, the longest chain of data nodes in the clustered node, an average number of chains in the clustered node, the total number of nodes that can be readied directly and/or indirectly from the clustered node, lookup indicators on data nodes reachable from the clustered node (e.g., "ServerError node is reachable from this node"), backbone and/or data nodes corresponding to the clustered node that include screenshots, and/or any other suitable statistical information. For example, if a first clustered node represents 35 of 100 identified backbone nodes, the clustered node summary could indicate that the first clustered node included 35 nodes (e.g., 35 instances of test steps that was responsive to the verification query) and that the longest chain of backbone nodes was 15 (e.g., the longest verification execution sequence after the test step corresponding to the clustered node included 15 test steps). An example of a clustered node summary is discussed in further detail with respect to, for example, FIG. 9A.

In some implementations, the visualization may include a test condition selection area to receive a selection of a test condition. In some implementations, the test condition selection area may be populated based on correlated data points. For example, test composition engine 340 may identify a number of test conditions that correspond to backbone nodes (e.g., original backbone nodes) associated with a clustered node, and populate the test condition selection area with the test conditions. In some implementations, the test conditions may represent items of the system used to test the AUT, such as operating system type used, browser used, AUT version tested, and/or any other suitable system items. For example, test composition engine 340 may populate the test selection area with actual system items used to test the AUT using, for example, a drop down menu. In some examples, a user may select a test condition from the test selection area (e.g., the drop down list) by interacting with the test selection area, and test composition engine 340 may receive the selection of the test condition. In response to receiving the selection of the test condition, a clustered node (e.g., a first clustered node) may be modified to generate a filtered clustered node (e.g., a first filtered clustered node). For example, if a user selects a particular operating system type as a test condition, test composition engine 340 may filter out backbone nodes in the clustered node that did not include the particular operating system selected.

Process 600 may also include identifying a new set of clustered nodes based on the selection (step S630). For example, once a particular clustered node has been selected, test composition engine 340 may execute a query of the correlated data for new backbone nodes that are immediately linked with the original backbone nodes corresponding to the selected clustered node (e.g., the first clustered node) of the original set of clustered nodes. In some implementations, test composition engine 340 may cluster these new backbone nodes to identify the new set of clustered nodes using, for example, the similarity algorithm described above.

Process 600 may also include causing the modification of the visualization to include the new set of clustered nodes (step S640). For example, the visualization may be modified to display the new set of clustered nodes as being linked to the selected node of the original set of clustered nodes (e.g., the first clustered node). In some implementations, the visualization may be modified to remove or fade unselected clustered nodes (e.g., unselected clustered nodes in the original set and/or new set of clustered nodes). Additionally, in some implementations, the visualization may include a clustered node summary for each of the new set of clustered nodes using, for example, the methods described above. The user may select one of the new set of clustered nodes, and one or more of steps S610-640 may be repeated until the last selected clustered node has no additional linked backbone nodes, or the user has otherwise decided to complete the future test composition. The resulting chain of selected clustered nodes may represent the future test and may correspond to a verification execution sequence. Once steps S610, S620, S630, and/or S640 have been performed, process 600 may end (step S655).

FIG. 7 is a flow chart of an example process 700 for composing future tests consistent with disclosed implementations. Although execution of process 700 is described below with reference to system 100 of FIG. 1 and/or specific components of system 100, other suitable systems and devices for execution of at least one step of process 700 may be used. For example, processes described below as being performed by test composition device 110 may be performed by test composition device 210, test composition device 310, and/or any other suitable device. Process 700 may be implemented in the form of executable instructions stored on a machine-readable storage medium and/or in the form of electronic circuitry.

Process 700 may start (step S705) after test executions of an AUT have been performed. For example, process 700 may start after data points during test executions have beers captured and correlated using, for example, the methods described above. Process 700 may include receiving input corresponding to a verification query of a correlated data structure (step S710). For example, a user may enter input corresponding to a verification query into a visualization displayed on a display device, and a computing system may transmit the input via network 140 to test composition device 110. Test composition device 110 may receive the input via, for example, interface circuitry, and may cause the performance of the verification query of repository 130, receive the results of the verification query, and cluster the received results into a set of original clustered nodes using, for example, the methods described above.

Process 700 may also include causing the display of a visualization of the results of the verification query (step S720). In some implementations, the visualization may include an original set of clustered nodes corresponding to the results. For example, the visualization may be generated using the methods described above, and test composition device 110 may cause the display of the visualization on, for example, a display (e.g., a display device that is the same as or similar to display 126 of client device 120). In some implementations, test composition device 110 may generate code to display the visualization, and transmit that code via interface circuitry and/or via network 140 to a computing system responsible for displaying the visualization.

Process 700 may also include receiving an interaction (e.g., a first interaction) with a first clustered node of the original set of clustered nodes, the interaction composing a first test step of a future test of the AUT (step S730). For example, a user may select a first clustered node using the methods described above (e.g., by clicking on a particular clustered node displayed in a visualization). The selection may be transmitted by a computing system via network 140 to test composition device 110, and test composition device 110 may receive the transmitted selection via, for example, interface circuitry.

Process 700 may also include causing the display, in response to the interaction, of a modified visualization (step S730). In some implementations, the modified visualization may include the first clustered node and a new set of clustered nodes linked to the first clustered node. For example, the modified visualization may be the same or similar to the modified visualization discussed with respect to, for examples, FIGS. 6 and 9B. In some implementations, the new set of clustered nodes may represent test steps performed during the historical test executions that flow from test steps corresponding to the first clustered node (e.g., next steps in historical test execution sequences). For example, the new set of clustered nodes may include clustered nodes that represent similar test steps performed immediately after the test step corresponding to the first clustered node.

In some implementations, the visualization may be modified to display a clustered node summary. For example, in response to a second interaction with the original set of clustered nodes, test composition device 110 may cause the display of a clustered node summary. In some implementations, the clustered node summary may include statistical information corresponding to the first clustered node. For example, the clustered node summary may be the same as or similar to the clustered node summary discussed with respect to FIGS. 6 and 9A. Once steps S710, S720, S730, and/or S740 have been performed, process 600 may end (step S755).

FIG. 8 is a flow chart of an example process 800 for composing future tests consistent with disclosed implementations. Although execution of process 800 is described below with reference to system 100 of FIG. 1 and/or specific components of system 100, other suitable systems and devices for execution of at least one step of process 800 may be used. For example, processes described below as being performed by test composition device 110 may be performed by test composition device 210, test composition device 310, and/or any other suitable device. Process 800 may be implemented in the form of executable instructions stored on a machine-readable storage medium and/or in the form of electronic circuitry.

Process 800 may start (step S805) after test executions of an AUT have been performed. For example, process 800 may start after data points during test executions have been captured and correlated using, for example, the methods described above. Process 800 may include identifying, using a test composition engine, results responsive to a verification query of a correlated data structure (step S810). In some implementations, the correlated data structure may include backbone nodes corresponding to test steps performed during historical test executions of an application under test and data nodes corresponding to the test steps. Process 800 may also include clustering, using the test composition engine, the results into an original set of clustered nodes using a set of clustering rules (step S820), causing, using the test composition engine, a generation of a visualization of the original set of clustered nodes (step S830), and/or identifying, using the test composition engine and based on a selection of a first clustered node of the original set of clustered nodes, a new set of clustered nodes linked to the first clustered node (step S840). For example, the new set of clustered nodes may be identified based on sequences of events that occurred during the historical test execution, and the selection may compose a first test step of a future test of the AUT. Process 700 may also include causing, using the test composition engine, a modification of the visualization, the modified visualization including the new set of clustered nodes (step S850). Steps S810, S820, S830, S840, and/or S850 may be performed using, for example, methods that are the same as or similar to the methods described above. Once steps S810, S820, S830, S840, and/or S850 have been performed, process 800 may end (step S865).

Figure 9A:
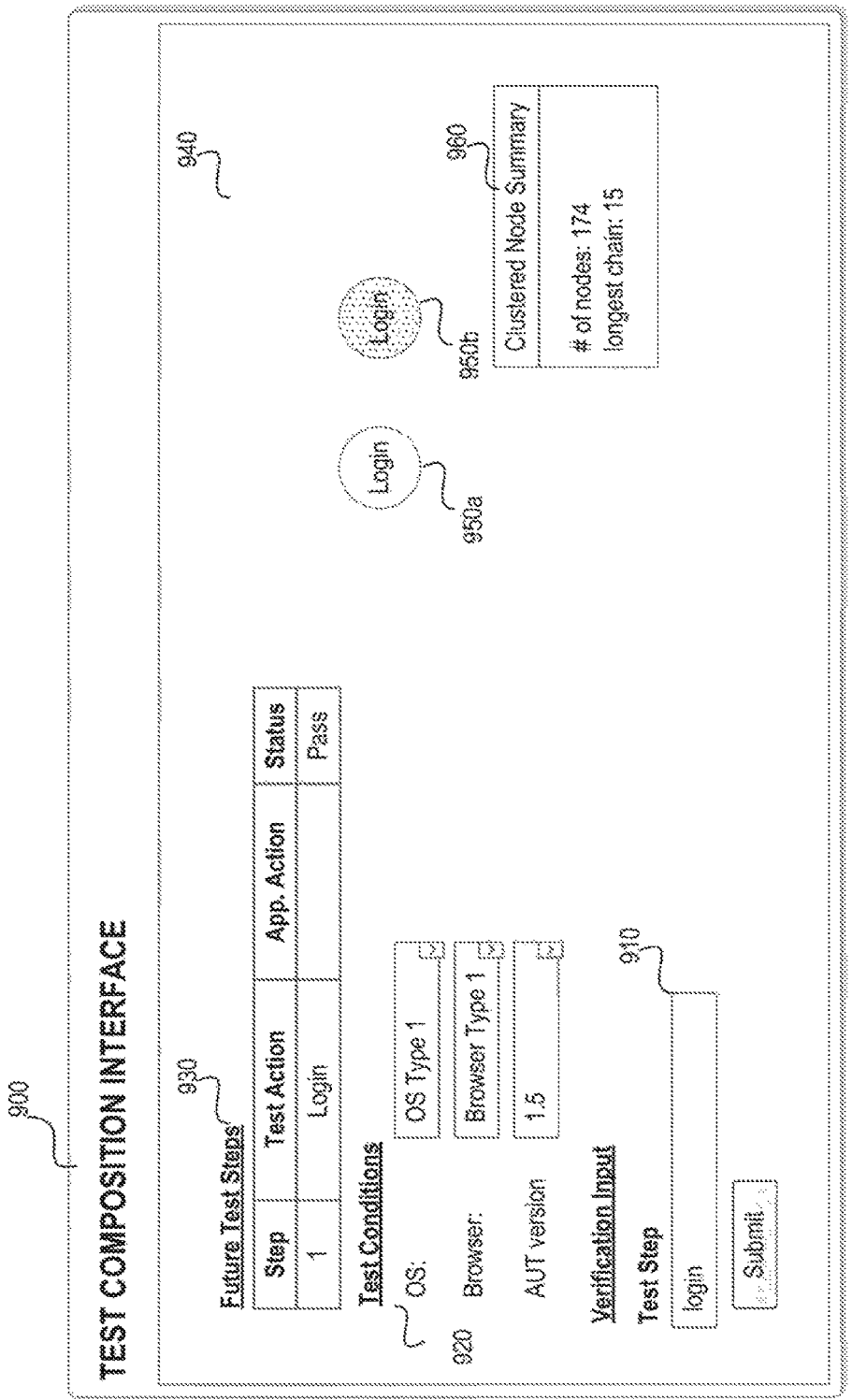
FIGS. 9A and 9B are illustrations of example test composition interfaces consistent with disclosed implementations.
Figure 9B:
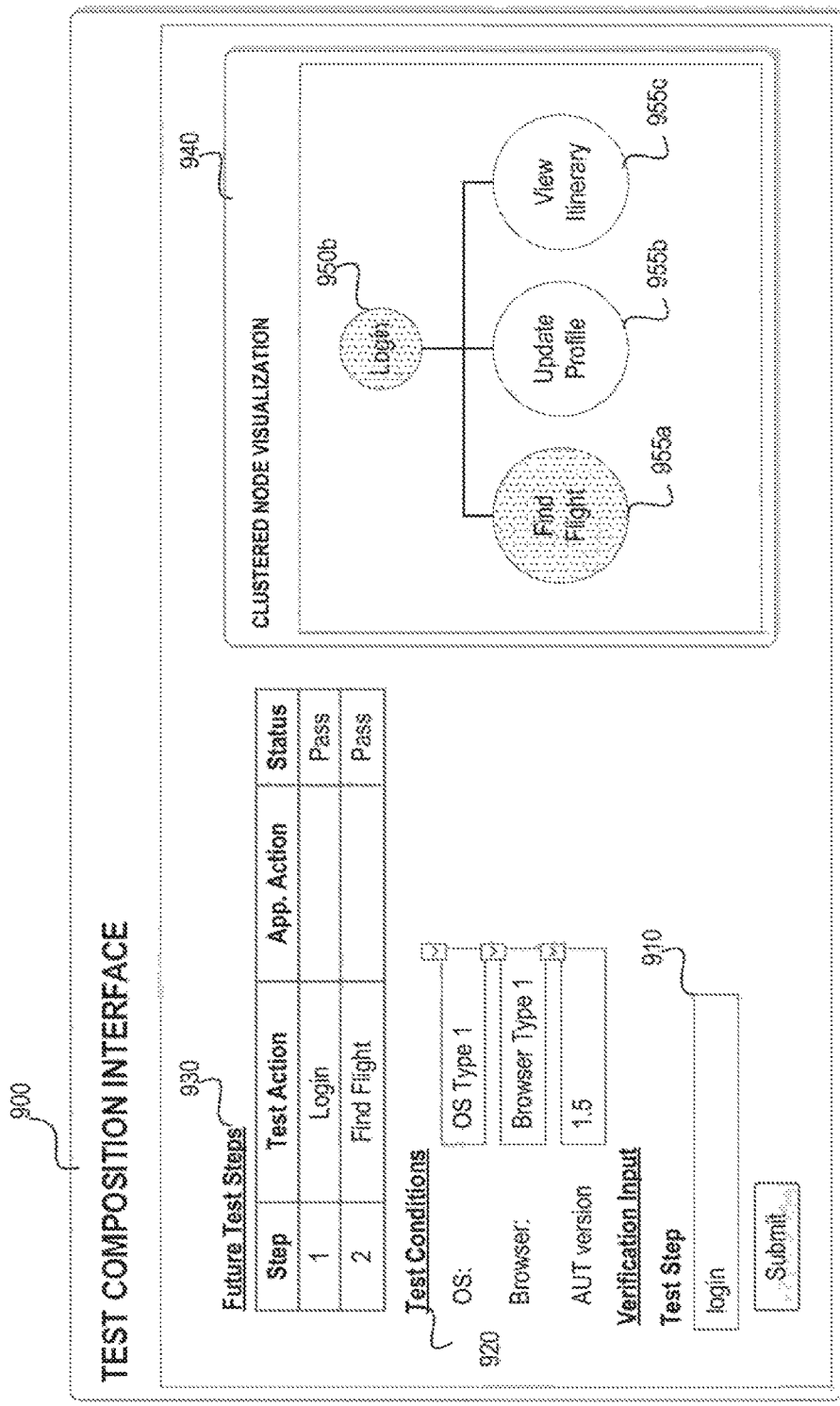

FIGS. 8A and 9B are illustrations of example test verification interfaces 900 consistent with disclosed implementations. For example, FIG. 9A illustrates a test verification interface 900 displaying a visualization including an original set of clustered nodes and FIG. 9B illustrates test verification interface 900 displaying a modified visualization including a first clustered node of the original set of clustered nodes and a new set of clustered nodes. In some implementations, interface 900 may be generated by test composition device 110 using data obtained from, for example, a non-transitory machine-readable medium, repository 130, and/or another device or system. For example, test composition device 110 may obtain information related to the correlated data points stored in repository 130 using the methods described above. In some implementations, test composition device 110 may cause the display of interface 300 on a display device.

As shown in FIG. 9, interface 900 may include a verification input area 910 for displaying and/or receiving verification input, a test condition selection area 920 to receive a selection of a test condition, a future test step identification area 930 to identify selected future test steps, and a clustered node visualization area 940 for visualizing clustered nodes. As shown in FIG. 9, interface 900 may display information in areas 910, 920, 930, and/or 940 as text, graphics, or a combination of text and graphics in a way that aids the user in composing future tests. Example interfaces consistent with disclosed implementations may include text and/or graphics having different colors, sizes, shape, and the like than the examples shown in FIGS. 9A and 9B.

In the example shown in FIG. 9A, verification input area 910 may function to receive input from a user related to a verification query. For example, a user may input text into verification input area to identify a test step that the user may want to include in a future test. While the example shown in FIG. 9A illustrates input related to a test step, verification input areas consistent with disclosed examples could also include an area for inputting application action information in addition to or in lieu of test step information. In the example shown in FIG. 9A, a user has entered the test step "login" into verification input area 910.

Test condition selection area 920 may function to receive a selection of a test condition. As discussed above, test condition selection area may be populated with data corresponding to the backbone nodes that make up a selected clustered node. In the example shown in FIG. 9A, test composition device 110 has prepopulated the test condition selection area 920 with information relating to operating system type, browser type, and AUT version type. In this example, the test condition selection area include a drop down menu that lists all of this information in a number of different drop down lists that the user can select from. In this example, the user has selected a "OS Type 1", "Browser Type 3", and AUT Version "1.5," but the user could select any number of test conditions (including none at all), and the test conditions consistent with disclosed examples can be displayed using any suitable format.

Future test step identification area 930 may function to identify selected future test steps, such as test steps selected using the methods described above. In the example shown in FIG. 9A, the first test step that has been selected for a future test is "Login." In this example, no corresponding application action is required for the first test step, but examples consistent with disclosed implementations could also identify a corresponding application action to verify.

Clustered node visualization area 940 may function to visualize clustered nodes. For example, clustered node visualization area 940 may include graphical indicators corresponding to an original set of clustered nodes (nodes 950a, 950b). As shown in FIG. 9A, a user has interacted with interface 900 to display a clustered node summary associated with clustered node 950b. While in this example only one clustered node summary is illustrated, interface 900 can include any number of clustered node summaries. For example, at least one clustered node summary may be displayed for each clustered node (950a, 950b). As another example, the cluster node summary need not be displayed in response to a user interaction and can instead be displayed automatically. Additionally, while in the example shown in FIG. 9A there are two clustered nodes in the illustrated original set of clustered nodes, sets of clustered nodes can include any whole number of clustered nodes that are greater than 0 (e.g., 1, 4, 5, 100, etc.).

Turning to FIG. 9B, FIG. 9B illustrates test verification interface 900 including a modified visualization (e.g., clustered node visualization area 940 and future test step identification area 930 have been modified). In the example shown in FIG. 9B, a user may have selected clustered node 950b. The selection of clustered node 950b modified clustered node visualization area 940 in that the remaining unselected nodes of the original set of clustered nodes (e.g., clustered node 950b) were removed, and a new set of clustered nodes is displayed as being linked to selected clustered node 950b. For example, subsequent test steps linked to backbone nodes corresponding to clustered node 950b were clustered by, for example, test composition device 110 into three new clustered nodes, 955a, 955b, and 955b. Thus, in the example shown in FIG. 9B, test executions that performed a test step of "login" subsequently performed test steps of "find flight," "update profile," and "view itinerary." The text used to populate the graphic elements representing the clustered nodes in the visualization (in this example, circles) may be obtained from metadata captured and correlated using the methods described above. In the example shown in FIG. 9B, a user may have selected the "Find Flight" node to compose a second test step, and the visualization shown in FIG. 9B may continue to be modified to show further sets of clustered nodes that can continue to be selected to compose the future test.

The disclosed examples may include systems, devices, machine-readable storage media, and methods for composing future tests. For purposes of explanation, certain examples are described with reference to the components illustrated in FIGS. 1-9B. The functionality of the illustrated components may overlap, however, and may be present in a fewer or greater number of elements and components. Further, all or part of the functionality of illustrated elements may co-exist or be distributed among several geographical dispersed locations. Moreover, the disclosed examples may be implemented in various environments and are not limited to the illustrated examples.

Moreover, as used in the specification and the appended claims, the singular forms "a," "an," and "the" are intended to include the plural forms as well, unless the context indicates otherwise. Additionally, although the terms first, second, etc. may be used herein to describe various elements, these elements should not be limited by this terms. Instead, these terms are used to distinguish one element from another.

Further, the sequence of operations described in connection with FIGS. 1-9B are examples and are not intended to be limiting. Additional or fewer operations or combinations of operations may be used or may vary without departing from the scope of the disclosed examples. Furthermore, implementations consistent with the disclosed examples need not perform the sequence of operations in any particular order, including those described with respect to FIGS. 1-9B. Thus, the present disclosure merely sets forth possible examples of implementations, and many variations and modifications may be made to the described examples. All such modifications and variations are intended to be included within the scope of this disclosure and protected by the following claims.

We claim:

1. A system for composing future tests comprising:
a processor;
a machine-readable storage medium on which is stored instruction that, when executed by the processor, cause the processor to:
capture data points during test executions of an application under test, the data points including test action data and application action data;
correlate each of the data points with a particular test execution of the test executions,
each of the data points being correlated based on a sequence of events that occurred during the particular test execution, wherein the instructions to correlate the data points comprise instructions to:
categorize the data points as backbone nodes corresponding to test steps performed during historical executions of the application under test and data nodes corresponding to the test steps;
connect the data points for the data nodes to the data points for the backbone nodes via directed edges in a directed acyclic graph (DAG) based on timestamps;
assign metadata as vertices connected to the backbone nodes; and
assign tags to the directed edges to identify a type of relation between the vertices; and
compose, based on an interaction with a visualization of results of a verification query of the correlated data points, a future test of the application under test.

2. The system of claim 1, wherein the instructions are further to cause the processor to compose the future test by:
causing the generation of the visualization of the results of the verification query of the correlated data points, the visualization including an original set of clustered nodes;
receiving a selection of a first clustered node of the original set of clustered nodes;
identifying a new set of clustered nodes based on the selection; and
causing the modification of the visualization to include the new set of clustered nodes.

3. The system of claim 2, wherein the original set of clustered nodes is clustered based on a set of clustering rules.

4. The system of claim 2, wherein the visualization further includes a test condition selection area to receive a selection of a test condition, the test condition selection area being populated based on the correlated data points.

5. The system of claim 4, wherein in response to receiving the selection of the test condition, the first clustered nodes is modified to generate a filtered first clustered node.

6. The system of claim 2, wherein the selection composes a first test step of the future test.

7. The system of claim 2, wherein the visualization includes a clustered node summary, the clustered node summary including statistical information corresponding to the first clustered node, the information being based on an analysis of the correlated data points corresponding to the first clustered node.

8. The system of claim 2, wherein the original set of clustered nodes are backbone nodes.

9. A non-transitory machine-readable storage medium on which is stored instructions which, when executed by a processor, cause the processor to:
receive input corresponding to a verification query of a correlated data structure, the correlated data structure including backbone nodes corresponding to test steps performed during historical test executions of an application under test and data nodes corresponding to the test steps;
cause display of a visualization of the results of the verification query, the visualization including an original set of clustered nodes corresponding to the results;
receive an interaction with a first clustered node of the original set of clustered nodes, the interaction composing a first test step of a future test of the application under test; and
cause, in response to the interaction, display of a modified visualization, the modified visualization including the first clustered node and a new set of clustered nodes linked to the first clustered node.

10. The non-transitory machine-readable storage medium of claim 9, wherein the new set of clustered nodes may represent the test steps performed during the historical test executions that flow from test steps corresponding to the first clustered node.

11. The non-transitory machine-readable storage medium of claim 9, wherein:
the interaction is a first interaction; and
the processor is to, in response to a second interaction with the original set of clustered nodes, cause the display of a clustered node summary, the clustered node summary including statistical information corresponding to the first clustered node.

12. The non-transitory machine-readable storage medium of claim 9, wherein the instructions are further to cause the processor to correlate the data structure by:
categorizing data points in the data structure into at least one of a plurality of types, the at least one of a plurality of types including a first type;
assigning the data points categorized as the first type as the backbone nodes of a directed acyclic graph;
connecting the remaining data points as the data nodes to the backbone nodes via directed edges based on timestamps associated with the remaining data points, the remaining data points being a set of the data points not categorized as the first type;
assigning metadata as vertices connected to the backbone nodes; and
assigning tags to the directed edges to identify a type of relation between the vertices.

13. A computer-implemented method comprising:
identifying, by a processor, results responsive to a verification query of a correlated data structure, the correlated data structure including backbone nodes corresponding to test steps performed during historical test executions of an application under test and data nodes corresponding to the test steps;
clustering, by the processor, the results into an original set of clustered nodes using a set of clustering rules;
causing, by the processor, a generation of a visualization of the original set of clustered nodes;
identifying, by the processor based on a selection of a first clustered node of the original set of clustered nodes, a new set of clustered nodes linked to the first clustered node; and
causing, by the processor, a modification of the visualization, the modified visualization including the new set of clustered nodes.

14. The computer-implemented method of claim 13, wherein the new set of clustered nodes is identified based on sequences of events that occurring during the historical test executions.

15. The computer-implemented method of claim 13, wherein the selection composes a first test step of a future test of the application under test.

16. The computer-implemented method of claim 13, further comprising correlating the data structure by:
categorizing data points in the data structure into at least one of a plurality of types, the at least one of a plurality of types including a first type;
assigning the data points categorized as the first type as the backbone nodes of a directed acyclic graph;
connecting the remaining data points as the data nodes to the backbone nodes via directed edges based on timestamps associated with the remaining data points, the remaining data points being a set of the data points not categorized as the first type;
assigning metadata as vertices connected to the backbone nodes; and assigning tags to the directed edges to identify a type of relation between the vertices.

* * * * *